(12) United States Patent
Glickman (10) Patent No.: US 7,483,583 B2
(45) Date of Patent: Jan. 27, 2009

(54) SYSTEM AND METHOD FOR PROCESSING IMAGE DATA

(75) Inventor: Jeff Glickman, Las Vegas, NV (US)

(73) Assignee: InFocus Corporation, Wilsonville, OR (US)

( * ) Notice: Subject to any disclaimer, the term of this patent is extended or adjusted under 35 U.S.C. 154(b) by 959 days.

(21) Appl. No.: 11/012,985

(22) Filed: Dec. 14, 2004

(65) Prior Publication Data

US 2005/0129323 A1   Jun. 16, 2005

Related U.S. Application Data

(60) Provisional application No. 60/530,469, filed on Dec. 16, 2003.

(51) Int. Cl.
*G06K 9/46* (2006.01)
*G06K 9/36* (2006.01)
*G06K 9/68* (2006.01)

(52) U.S. Cl. .................... 382/240; 382/236

(58) Field of Classification Search ........... 382/164, 382/173, 218, 232, 233, 236, 240; 375/240.19, 375/E7.134, E7.138, E7.176; 359/142, 143; 348/211.2, E9.047; 455/556.1; 353/122; 345/1.1
See application file for complete search history.

(56) References Cited

U.S. PATENT DOCUMENTS

| | | | |
|---|---|---|---|
| 6,690,833 B1 * | 2/2004 | Chiang et al. | 382/236 |
| 6,860,609 B2 | 3/2005 | Olson et al. | |
| 6,978,049 B2 * | 12/2005 | Chui et al. | 382/240 |
| 6,985,632 B2 * | 1/2006 | Sato et al. | 382/240 |
| 7,024,046 B2 * | 4/2006 | Dekel et al. | 382/240 |
| 7,095,900 B2 * | 8/2006 | Schwartz et al. | 382/251 |
| 7,215,819 B2 * | 5/2007 | Onno et al. | 382/240 |
| 2001/0033404 A1 | 10/2001 | Escobosa et al. | |
| 2002/0012433 A1 | 1/2002 | Haverinen et al. | |
| 2003/0017846 A1 | 1/2003 | Estevez et al. | |
| 2005/0129323 A1 * | 6/2005 | Glickman | 382/240 |

OTHER PUBLICATIONS

Babel et al., *Lossless and lossy minimal redundancy pyramidal decomposition for scalable image compression technique*, UMR CNRS 6164 IETR Groupe Image ICASSP 2003, pp. 249-252.

You et al, *Pyramidal image compression using anisotropic and error-corrected interpolation*, Department of Electrical Engineering, University of Minnesota. 2003.

Pettelkau, Jeff. Toshiba TDP-SW20 Wireless DLP Projector. Oct. 2004 [retrieved on Mar. 15, 2007]. Retrieved from the Internet: <URL:http://www.jiwire.com/toshiba-TDP-SW20-wireless-projector-photo-image-gallery.htm>.

* cited by examiner

*Primary Examiner*—Amir Alavi
(74) *Attorney, Agent, or Firm*—Alleman Hall McCoy Russell & Tuttle LLP (57) ABSTRACT

A method of transmitting a plurality of frames of image data over a communications channel from a display image source to a display device is disclosed, wherein the plurality of frames of image data are transferred on a frame-by-frame basis at a predetermined time interval. The method includes encoding at least a portion of a selected frame of image data via hierarchical encoding to form a hierarchically encoded set of image data layers, and sending only a subset of the set of image data layers over the communications channel, wherein the subset of image data layers includes fewer image data layers than the set of image data layers.

35 Claims, 6 Drawing Sheets

SYSTEM AND METHOD FOR PROCESSING IMAGE DATA

CROSS-REFERENCE TO RELATED APPLICATION

The present application claims priority from U.S. Provisional Patent Application Ser. No. 60/530,469 filed Dec. 16, 2003, hereby incorporated by reference in its entirety for all purposes.

TECHNICAL FIELD

The present disclosure relates generally to apparatus, systems and methods for processing data, and more specifically, apparatus, systems and methods for transmitting a plurality of frames of image data over a communications channel from a display image source to a display device.

BRIEF DESCRIPTION OF DRAWINGS

The disclosure is illustrated by way of example and not by way of limitation in the figures of the accompanying drawings, in which the like references indicate similar elements and in which.

DETAILED DESCRIPTION

Figure 1:
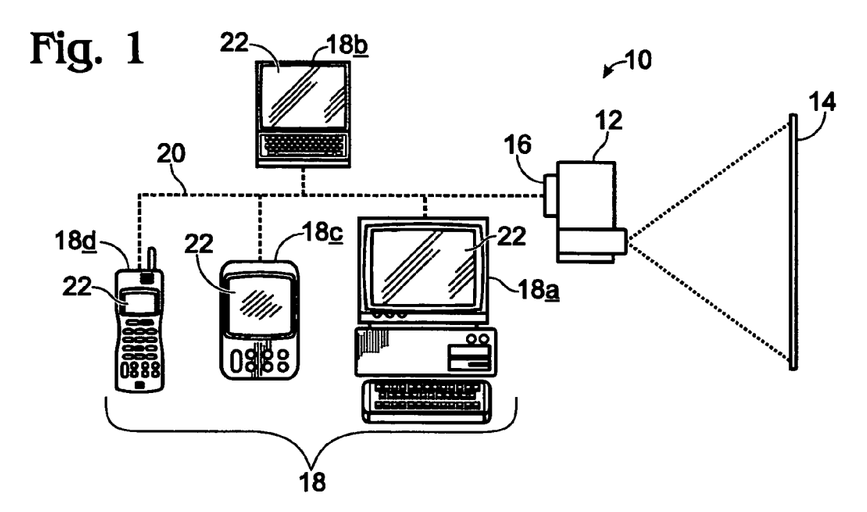
FIG. 1 is a schematic view of an image data processing system according to an embodiment of the present invention.

FIG. 1 shows, generally at 10, a schematic depiction of an image processing system according to a first embodiment of the present invention. Image processing system 10 includes a display device 12 configured to display an image on a viewing surface 14. Display device 12 may be any suitable type of display device. Examples include, but are not limited to, liquid crystal display (LCD) and digital light processing (DLP) projectors, television systems, computer monitors, etc.

Image processing system 10 also includes an image-rendering device 16 associated with display device 12, and one or more image sources 18 in electrical communication with image-rendering device 16. Image-rendering device 16 is configured to receive image data transmitted by image sources 18, and to process the received image data for display by display device 12. Image-rendering device 16 may be integrated into display device 12, or may be provided as a separate component that is connectable to the display device. An example of a suitable image-rendering device is disclosed in U.S. patent application Ser. No. 10/453,905, filed on Jun. 2, 2003, which is hereby incorporated by reference.

Typically, image data is supplied to a display device via an image source such as a laptop or desktop computer, a personal digital assistant (PDA), or other computing device. Some display devices are configured to receive image data wirelessly from image sources, for example, via a communications protocol such as 802.11b (or other 802.11 protocols), Bluetooth, etc. These display devices may allow image sources to be quickly connected from almost any location within a meeting room, and thus may facilitate the use of multiple image sources with a single display device.

However, supporting the use of multiple image sources with a single display device may pose various difficulties. For example, different image sources may utilize different software to generate and/or display image files of different formats. In this case, a display device that supports multiple image sources may need to include suitable software for decompressing, rendering and/or displaying many different types of image files. In many cases, this software may be provided by a company other than the display device manufacturer. Thus, installing and updating such software may expose the display device to software viruses, programming bugs, and other problems that are out of the control of the display device manufacturer. Furthermore, a relatively large amount of memory and processing power may be required to store and execute the multiple software programs needed to display all of the desired image data formats.

One possible way to decrease the amount of software needed on the display device may be to transfer only raw data files from each image source to the display device, rather than formatted image data files. In this case, the display device may only have to support a single image data format, which may simplify the software requirements of the display device. However, such raw data files may be large compared to formatted image files, and thus may require a relatively long time to transfer from the image source to the display device, depending upon the bandwidth of the communications channel used. Where it is desired to display real-time video with such a display device, the bandwidth of the communication channel may be too small for raw image data files to be transferred at typical video data frame rates (typically approximately 20 frames/second or greater).

Referring back to FIG. 1, image sources 18 may include any suitable device that is capable of providing image data to image-rendering device 16. Examples include, but are not limited to, desktop computers and/or servers 18a, laptop computers 18b, personal digital assistants (PDAs) 18c, mobile telephones 18d, etc. Additionally, image sources 18 may communicate electrically with image-rendering device 16 in any suitable manner. In the depicted embodiment, each image source 18 communicates electrically with image-rendering device 16 over a wireless network 20. However, image sources 18 may also communicate with image-rendering device 16 over a wired network, over a wireless or wired direct connection, etc. or any combination thereof.

Where image sources 18 are configured to process image data in multiple formats, image-rendering device 16 may be configured to decode data in each desired image data format. However, as described above, this may require image-rendering device 16 to have sufficient memory to store separate software programs for decoding each desired format. Additionally, many of these software programs may be provided by sources other than the manufacturer of image-rendering device 16. Thus, the use of such software may reduce the control the manufacturer of image-rendering device 16 has over the software programs installed on the image-rendering device and/or display device 12. This may open these display devices up to viruses, bugs and other problems introduced by outside software during software installations, updates and the like.

In order to simplify the operation of and software requirements for image-rendering device 16, each image source 18 may include software configured to generate a bitmap of an image on display 22, and then to transmit the bitmap to image-rendering device 16 for display by display device 12. This offers the advantage that image-rendering device 16 needs only to include software for receiving and decoding image data of a single format, and thus helps to prevent the introduction of viruses, bugs and other problems onto image-rendering device 16 during installation of software and/or updates. However, as described above, uncompressed bitmap files may be quite large, and thus may take a relatively long time to transmit to image-rendering device 16, depending upon the bandwidth of the communications channel used. This is especially true for images in relatively high-resolution formats, such as XGA and above. Where the data is video data, the rate at which new data frames are transferred to image-rendering device 16 may be approximately 20 frames/second or greater. In this case, the frame rate may be faster than the rate at which an entire bitmap can be generated and transmitted to image-rendering device 16, possibly resulting in errors in the transmission and display of the video image.

Figure 2:
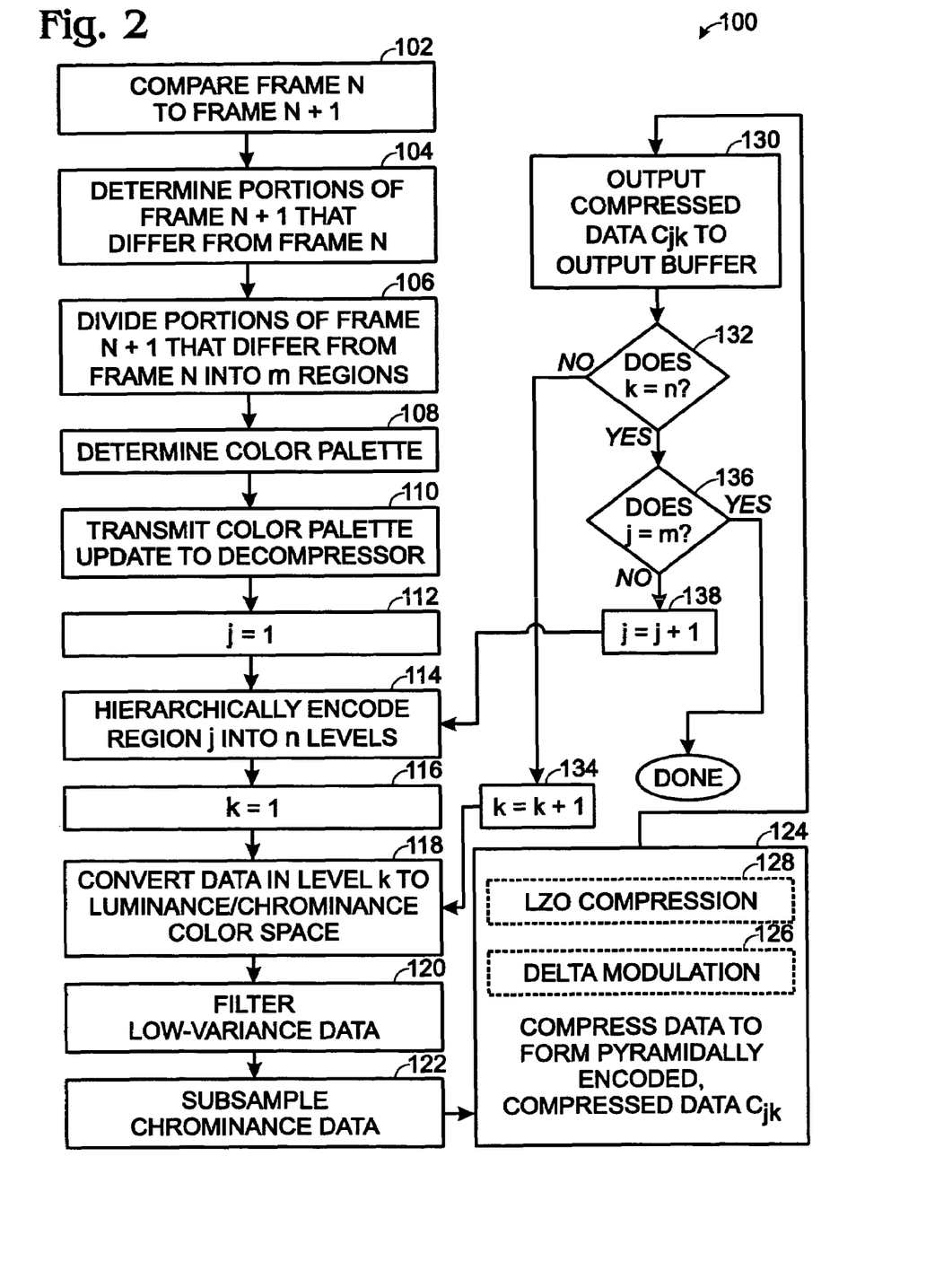
FIG. 2 is a flow diagram of an exemplary method of processing image data according to an embodiment of the present invention.

To avoid transmission and display errors, a bitmap generated from an image displayed on one of image sources 18 may be processed before transmission to reduce the amount of data transmitted for each frame of image data. FIG. 2 shows, generally at 100, an exemplary embodiment of a method of processing bitmap image data generated from a display 22 on one of image sources 18. Method 100 is typically carried out by software code, typically stored in memory on image sources 18, executable by a processor on each image source.

In order to reduce the amount of data that is transmitted to image-rendering device 16, method 100 transmits only those portions of a frame or set of image data that differ from the frame or set of image data transmitted immediately prior to the current frame. Thus, method 100 first compares, at 102, a previously transmitted set or frame of image data N to a set or frame of image data N+1 that is currently displayed on display 22, and then determines, at 104, portions of frame N+1 that differ from frame N.

Figure 3:
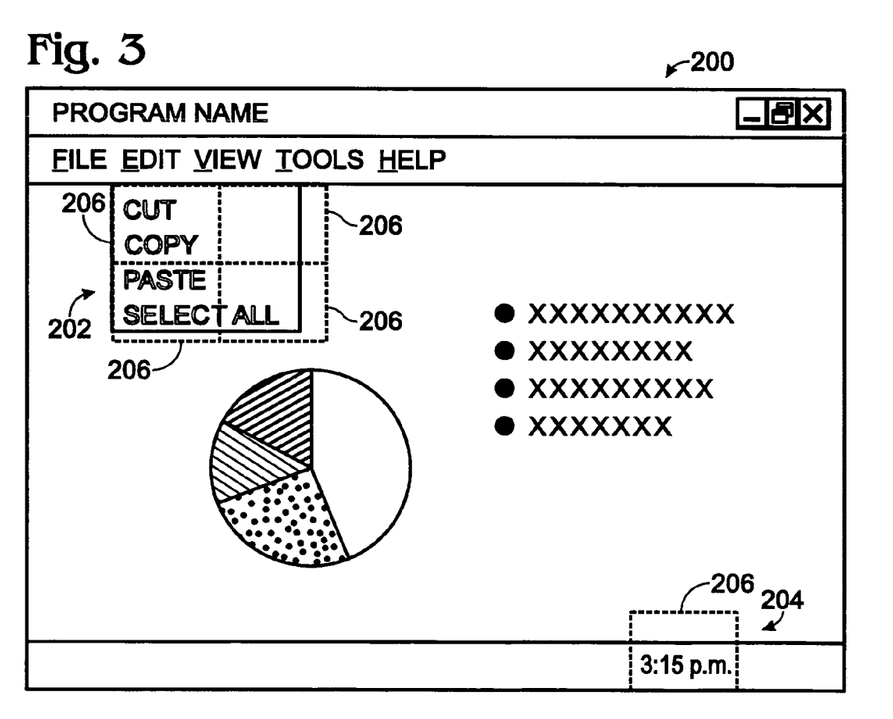
FIG. 3 is a view of an exemplary image displayed on an image source display, showing changed portions of the image divided into regions for encoding.

The comparison of the two frames of image data at 102 and the determination of changed regions at 104 may be performed in any suitable manner. For example, each of frames N and N+1 may be stored in buffers, and then each pixel of image data stored in the N+1 buffer may be compared to each pixel of image data stored in the N buffer.

Where changes are located, the changed regions may be defined for compression in any suitable manner. For example, in some embodiments, all of the detected changes may be defined by a single rectangular region of variable size that is drawn to encompass all of the changed regions of frame N+1 of the image data. However, situations may exist in which such a scheme of defining changed regions leads to the compression and transmission of significant quantities of data that is actually unchanged from the previously sent frame. For example, referring to FIG. 3, during the presentation of a still image 200, such as during a slide show generated from a display on a laptop computer, a user may activate a pull-down menu 202 at the top left corner of the display at the same time as a clock symbol 204 located at the bottom right corner of the display is updated. In this situation, defining the changed regions by a single rectangular boundary may result in essentially the entire screen being encompassed by the boundary. This may result in the compression and transmission of much unchanged data, and thus may reduce the efficiency of the compression and transmission of the image data.

As an alternative to defining all changed regions by a single boundary, method 100 includes, at 106, defining changed portions of image data frame N by dividing the changed portions into m different regions. These regions are indicated schematically in FIG. 3 at 206. Regions 206 typically are of a set, equal size, and may be any suitable size. In the depicted embodiment, the pull-down menu is covered by four regions 206, and the clock icon by a single region. However, it may be desirable to utilize relatively smaller-sized regions 206 to reduce the amount of unchanged data that is compressed and transmitted along with the changed data.

Referring again to FIG. 2, either before, concurrently with, or after dividing the changed portions of image 200 into regions 206, method 100 may include determining, at 108, the color palette of the image being encoded and transmitted, and transmitting, at 110, an update regarding the color palette to image-rendering device 16 to aid in the decompression of the compressed image data. This is because a 24-bit color may be abbreviated by an 8-bit lookup value in a color palette. When the color is used repeatedly, the 8-bit abbreviation results in less data to transmit.

Next, method 100 includes initializing a loop counter j=1 at 112, and then hierarchically encoding each region of the m total regions at 114. The loop counter initialized at 112 counts the number of regions 206 that have been hierarchically encoded. One example of hierarchical encoding is pyramidal encoding. Pyramidal encoding involves encoding an image (or a portion of an image) as a plurality of layers of detail, wherein each layer includes four times as many "pixels," or data points representing the appearance of a region of the image, as the next-highest layer, and wherein each pixel in each layer is an average of four adjacent pixels in the next-lowest layer. The data in each layer may be expressed as actual values, or as differences from the average values encoded in the next-highest layer. While the depicted embodiments are described as utilizing pyramidal encoding, it will be appreciated that any other suitable method of hierarchical encoding may be used.

Figure 4:
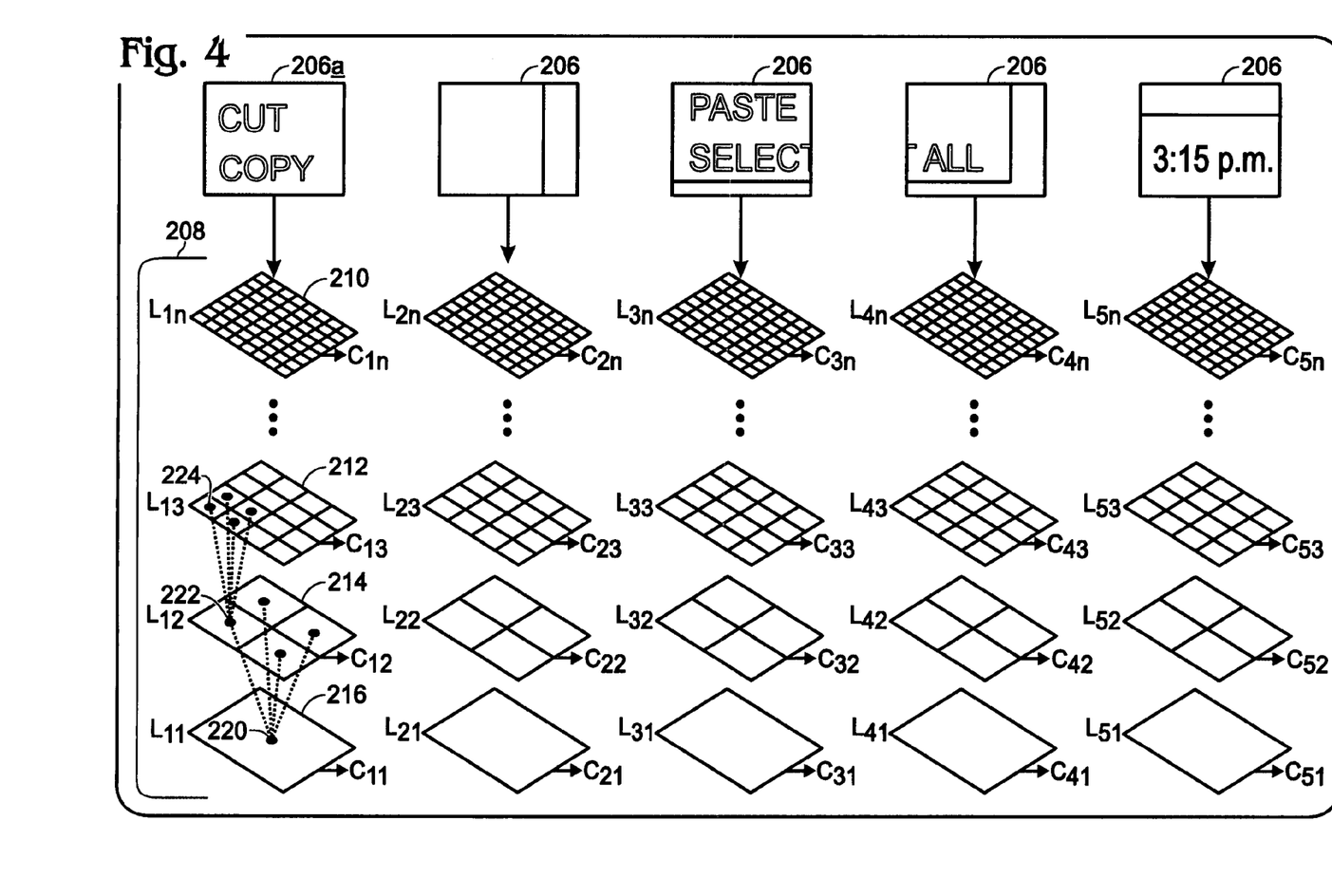
FIG. 4 is a schematic depiction of the pyramidal encoding and compression of each divided region of FIG. 3.

The pyramidal encoding of each region is illustrated schematically in FIG. 4. Each image region 206 to be transmitted to image-rendering device 16 is shown along the top of FIG. 4, and schematic representations of a set 208 of pyramidal layers for each region are shown below the regions. Each layer is labeled with the symbol $L_{mn}$, wherein the subscript m signifies which region 206 the level is associated with, and wherein the subscript n signifies the "depth" of the level in the set 208 of levels. For example, the most detailed level (the "lowest" level) for the leftmost region 206a is shown at 210, and is labeled $L_{1n}$. The "1" subscript indicates that the level includes data for the first region (m=1), and the n represents that the level is the lowest of "n" levels. The maximum value of n is dependent upon how many pyramidal levels are constructed, and is typically configured into the software. The third-least detailed level ("third level") $L_{13}$, second-least detailed level ("second level") $L_{12}$, and least detailed level ("first level" or "highest level") $L_{11}$ pyramidal levels for leftmost region 206a are shown in FIG. 4 at 212, 214 and 216, respectively.

The relationships between values in the first level 216, second level 214 and third level 212 are also shown in FIG. 4 via dashed lines. Value 220 in first level 216 represents an average of four adjacent values 222 in second level 214, and each value 222 in the second level represents an average of four values 224 in third level 212.

After pyramidally encoding each region into n layers, the image data in each pyramidal layer may be compressed via one or more compression steps to further reduce the amount of data sent over the communications channel. The compressed form of each layer $L_{mn}$ of image data is signified by the symbol $C_{mn}$ in FIG. 4. The image data in each pyramidal layer may be compressed in any suitable manner. In the embodiment of FIG. 2, the image data in each pyramidal layer is compressed via a plurality of compression steps to achieve a greater degree of compression than is possible via any of the utilized compression techniques alone.

The compression of each pyramidal layer for a pyramidally encoded region begins at 116, where a counter k that counts the number of pyramidal levels that have been compressed is initialized. Next, the image data in each pyramidal layer is optionally converted, at 118, to a luminance/chrominance color space. Examples of suitable luminance/chrominance color spaces include device-dependent color spaces such as the YCrCb color space, as well as device-independent color spaces such as the CIE XYZ and CIE L*a*b* color spaces. Another example of a suitable device independent color space is as follows. The color space includes a luminance r value and chrominance s and t values, and is derived from the CIE L*a*b* color space by the following equations:

$$r = (L^* - L^*_{min})(r_{max}/(L^*_{max} - L^*_{min})) \quad (1)$$

$$s = (a^* - a^*_{min})(s_{max}/(a^*_{max} - a^*_{min})) \quad (2)$$

$$t = (b^* - b^*_{min})(t_{max}/(b^*_{max} - b^*_{min})) \quad (3)$$

The r, s and t values calculated from these equations may be rounded or truncated to nearest integer values to change the format of the numbers from floating point to integer format, and thus to simplify calculations involving values in the color space. In these equations, the values $L^*_{max}$, $L^*_{min}$, $a^*_{max}$, $a^*_{min}$, $b^*_{max}$ and $b^*_{min}$ may correspond to the actual limits of each of the L*, a* and b* color space coordinates, or to the maximum and minimum values of another color space, such as the color space of a selected image device 18, when mapped onto the CIE L*a*b* color space. The values $r_{max}$, $s_{max}$ and $t_{max}$ correspond to the maximum integer value for each of the r, s and t color coordinates, and depend upon the number of bits used to specify each of the coordinates. For example, where six bits are used to express each coordinate, there are sixty-four possible integer values for each coordinate (0-63), and $r_{max}$, $s_{max}$ and $t_{max}$ each have the value 63.

After converting the image data in each pyramidal level to a luminance/chrominance color space, low variance data may be filtered, at 120 to make non-computer graphics data ("non-CG data") more closely resemble computer graphics data ("CG data"). Images having CG data, such as video games, digital slide presentation files, etc. tend to have sharper color boundaries with more high-frequency image data than images having non-CG data, such as movies, still photographs, etc. Due to the different characteristics of these data types at color boundaries, different compression algorithms tend to work better for CG data than for non-CG data. Some known image data processing systems attempt to determine whether data is CG data or non-CG data, and then utilize different compressors for each type of data. However, the misidentification of CG data as non-CG data, or vice versa, may lead to loss of compression efficiency in these systems. Thus, the filtering of low-variance data 120 may include identifying adjacent image data values with a variance below a preselected threshold variance, which may indicate a transition between similar colors, and then changing some of the image data values to reduce the variance, thereby creating a color boundary that more closely resembles CG data. The filtering of low-variance data may thus may allow non-CG data and CG data to be suitably compressed with the same compressor. The changes made to the non-CG data are typically made only to adjacent values with a variance below a perceptible threshold, although changes may optionally be made to values with a variance above a perceptual threshold.

Any suitable method may be used to filter low-variance data from the image data within an image data layer. One example of a suitable method is to utilize a simple notch denoising filter to smooth out the low variance data. A notch de noising filter may be implemented as follows. Let $p_c$ represent a current pixel, $p_l$ a pixel to the left of the current pixel, and $p_r$ a pixel to the right of the current pixel. First, the difference $d_l$ between $p_c$ and $p_l$ and the difference $d_r$ between $p_c$ and $p_r$ are calculated. Next, $d_l$ and $d_r$ are compared. If the absolute values of $d_l$ and $d_r$ are not equal, and the absolute value of the lower of $d_l$ and $d_r$ is below a preselected perceptual threshold, then $p_c$ may be reset to be equal to $p_l$ or $p_r$ to change the lower of $d_l$ and $d_r$ to zero. Alternately, either of $p_l$ and $p_r$ may be changed to equal $p_c$ to achieve the same result.

If the absolute values of $d_l$ and $d_r$ are equal, then changing $p_c$ to equal $p_l$ may be equivalent to changing $p_c$ to equal $p_r$. In this case, if the absolute value of $d_l$ and $d_r$ is below the predetermined perceptual threshold, then $p_c$ may be changed to equal either of $p_l$ and $p_r$. Furthermore, if the absolute values of $d_l$ and $d_r$ are both above the preselected perceptual threshold, then none of pc, $p_l$, or $p_r$ is changed. It will be appreciated that the above-described filtering method is merely exemplary, and that other suitable methods of filtering low-variance data to make non-CG more closely resemble CG data may be used. For example, where the absolute values of $d_l$ and $d_r$ are equal and below the preselected perceptual threshold, decision functions may be employed to determine whether to change a current pixel to match an adjacent pixel on the right or on the left, or above or below.

Besides filtering low-variance data to make non-CG data more closely resemble CG data, method 100 may also include, at 122, subsampling the chrominance values of the image data in each pyramidal layer. Generally, subsampling is a compression technique involves sampling at least one color space component at a lower spatial frequency than at least one other color space component. The decompressing device recalculates the missing components. Common subsampled data formats for luminance/chrominance color spaces include 4:2:2 subsampling, where the chrominance components are sampled at one half the spatial frequency of the luminance component in a horizontal direction and at the same spatial frequency in a vertical direction; and 4:2:0 subsampling, wherein the chrominance components are sampled at one half the spatial frequency of the luminance component along both vertical and horizontal directions. Either of these subsampling formats, or any other suitable subsampling format, may be used to subsample the chrominance components of the image data in each pyramidal layer.

After filtering low variance data at 120 and subsampling the chrominance data at 122, method 100 next employs, at 124 one or more other compression techniques to further reduce the amount of data transmitted. Typically, compression methods that provide good compression for CG data are utilized. In the depicted embodiment, method 100 employs a delta modulation compression step at 126, and an LZO compression step at 128. LZO is a real-time, portable, lossless, data compression library that favors speed over compression ratio, and is particularly suited for the real-time compression of CG data. LZO offers other advantages as well. For example, minimal memory is required for LZO decompression, and only 64 kilobytes of memory are required for compression. After each pyramidal layer of data is compressed, the layer $C_{mn}$ is output to an output buffer at 130 to await transmission to image-rendering device 16. Next, method 100 checks at 132 to determine if the entire set 208 of n pyramidal image data layers for region 206 have been compressed by comparing the counter k to the number n of levels. If k does not equal n, then k is increased, at 134, by one, and the compression of the next pyramidal layer commences at 118. Once all pyramidal image data layers have been compressed for region 206, method 100 verifies that k=n, and then proceeds to determine, at 136, whether all m regions 206 have been pyramidally encoded by determining whether the counter j=m. If j is not equal to m, then j is increased by one at 138, and method 100 loops back to 114 to begin the pyramidal encoding of the next region 206. In this manner, method 100 pyramidally encodes each region 206 of image 200 to form a corresponding set 208 of pyramidal image data layers, and also compresses each pyramidal layer of each region.

Once each region 206 has been pyramidally encoded and compressed, the compressed and pyramidally encoded image data may be transmitted to image-rendering-device 16. In the transmission of video data, the size of the set of pyramidally encoded and compressed image data representing the selected frame may be larger than the maximum amount of data that can be transmitted across the communications channel during a frame interval. In this case, image sources 18 may be configured to transmit only as much data as can be sent for one frame of image data before compression and transmission of the next frame begins.

Figures 5, 6:
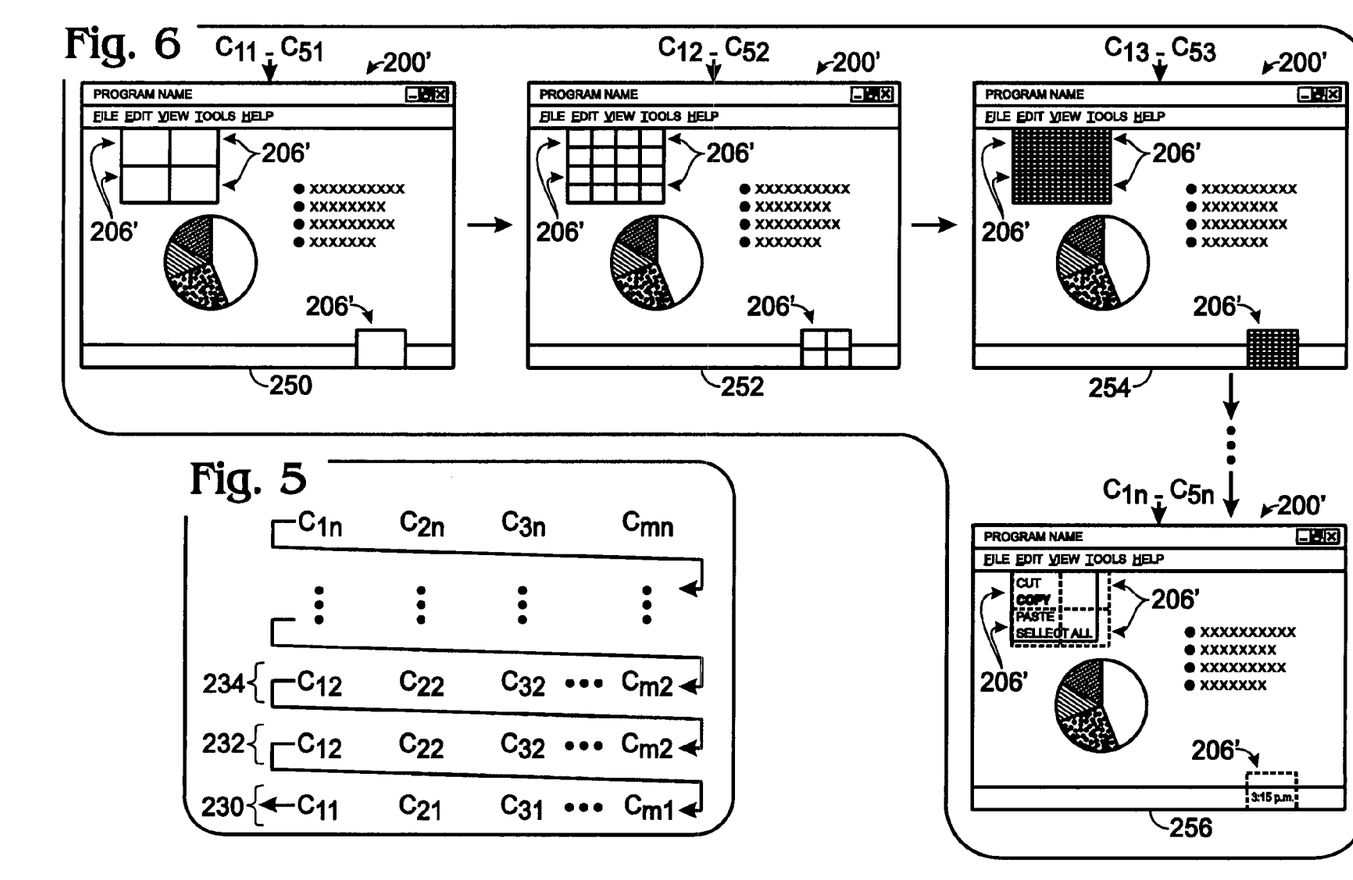
FIG. 5 is a schematic depiction of the transmission of a full set of pyramidally encoded and compressed image data from the image source to the display device.
FIG. 6 is a view of changes in the display of the image of FIG. 3 as a function of time during receipt and decompression of several exemplary image data layers.

The determination of how many layers to send may be performed in any suitable manner. For example, the entire set 208 of pyramidal layers for one region 206 may be sent before transmitting any layers for the next region 206. Alternatively, as illustrated in FIG. 5, the first layer 230 of pyramidally encoded data for each region 206 may be sent first, followed by the second pyramidally encoded layer 232, then the third layer 234, and so on until the maximum amount of data that can be sent during the frame interval has been sent. The transmission of a selected image data layer $C_{mn}$ for all m regions 206 before beginning transmission of a next-most detailed layer $C_{mn+1}$ for any region offers the advantage that at least some data is transmitted for all regions 206, even where the image data is only partially transmitted.

FIG. 5 illustrates the transmission of an entire set of image data. This may occur where a selected frame of image data is only partially changed from the immediately prior frame of image data. In a video presentation, for example, all of the image frames making up a single scene presentation may include common elements such as background colors, set colors, colors of clothing of actors in the video presentation, etc. Thus, during a single scene, the changes between frames are typically caused by shifts in position of the common elements, and may be encoded in a relatively small number of regions. In this case, the number of regions encoded may be small enough to allow transmission of a complete set of the pyramidally encoded compressed image data during a single frame interval.

FIG. 6 illustrates the progressive rendering and display of the entire set 208 of pyramidally encoded data for each region of image 200. The reference number 200' is used to indicate that the image in FIG. 6 is that projected by display device 12, rather than that displayed on one of image sources 18. Likewise, the reference number 206' is used to indicate the regions of image 200' corresponding to the compressed and encoded regions 206 of image 200.

First, as shown at 250, the first pyramidal layer of compressed image data, represented by the symbols $C_{11}$-$C_{51}$, is transmitted, decompressed and displayed. Next, as shown at 252, the second pyramidal layer of compressed image data, represented by the symbols $C_{12}$-$C_{52}$, is transmitted, decompressed and displayed, which introduces more detail into regions 206' of the displayed image. The decompression and display of the third pyramidal layer of compressed data, as shown at 254, introduces further detail into regions 206'. Thus, the scale of detail is changed by a factor of two in both horizontal and vertical directions of each region 206' with the decompression and display of each pyramidal level of image data. With the decompression and display of the most detailed layer of image data $C_{1n}$-$C_{5n}$, as shown at 256, all of the detail of the original image 200 not lost in lossy compression steps is incorporated into image 200'. It will be appreciated that the changes shown in FIG. 6 may not actually be displayed by display device 12, but instead may be made to data held in a buffer and displayed only when the decoding/decompression of all of the transmitted data for a frame of image data has been completed.

On the other hand, sometimes a large number of regions 206 may be required to encode the changes between some frames of image data in a video presentation. For example, frames found at scene changes, where backgrounds, clothing, and other elements change completely may have very few common pixels. Thus, encoding the changes in these frames may require dividing essentially the entire frame into regions 206 for encoding. Where a selected frame of image data has a large number of regions 206, it may not be possible to send all pyramidal layers for a frame of image data during a single frame interval. This is illustrated schematically in FIG. 7. In this case, transmission of image data may stop after the last full image layer 236 that can be transmitted has been transmitted, or may stop at an intermediate location in the next most-detailed image data layer 238, for example, at the location shown by line 240.

Figures 7, 8:
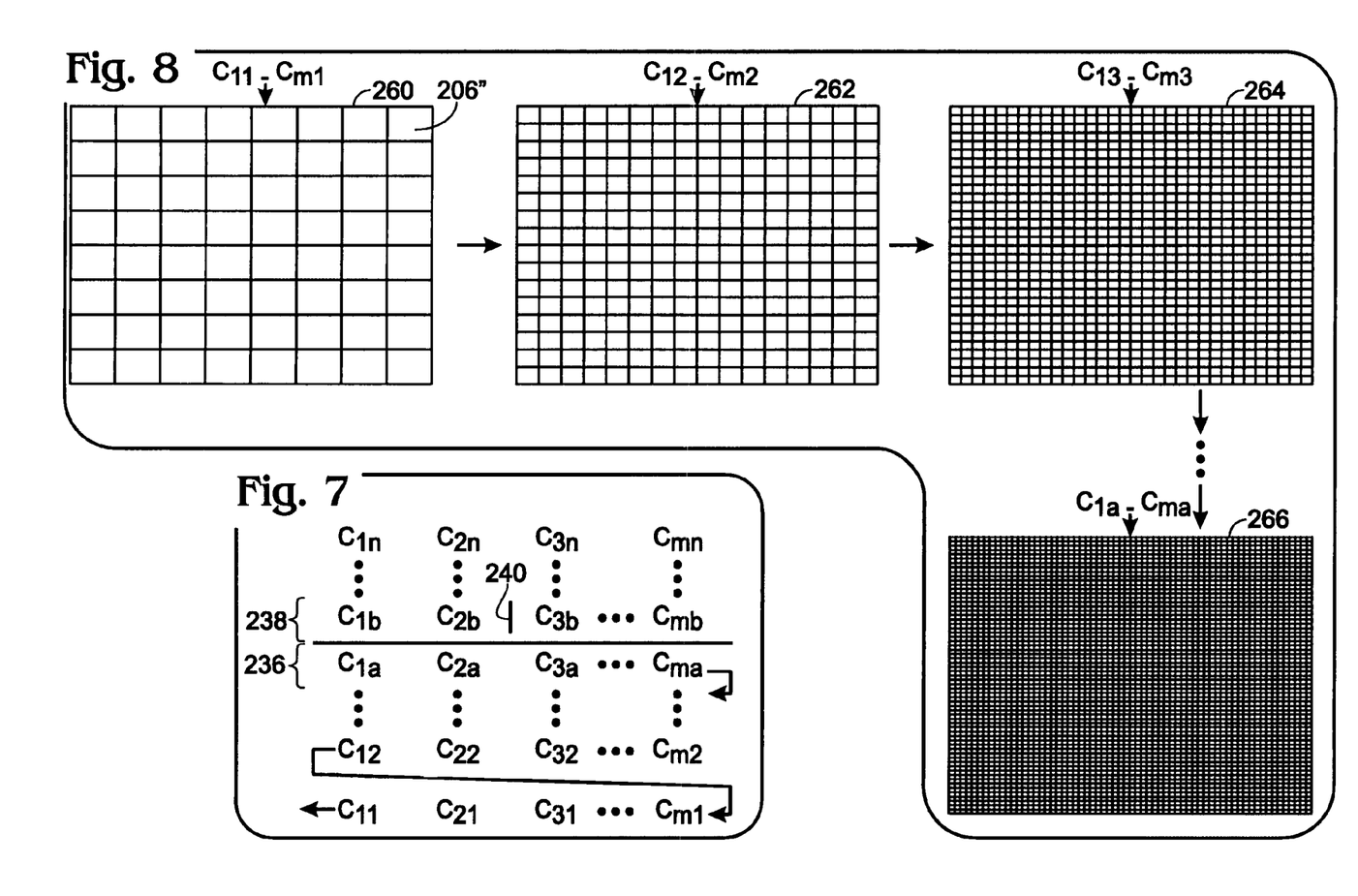
FIG. 7 is a schematic depiction of the transmission of only a subset of pyramidally encoded and compressed image data from the image source to the display device.
FIG. 8 is a view of changes in a display of the image data of FIG. 7 as a function of time during receipt and decompression of several exemplary image data layers.

FIG. 8 depicts the decompression of a frame of image data in which the changed regions 206" occupy essentially the entire image. As with the example of FIG. 6, the decompression and display of the first layer, second layer and third layer of image data, shown at 260, 262 and 264 respectively, introduce increasing levels of detail into the image. However, unlike the example of FIG. 6, transmission of the image data layers is stopped at some intermediate point, as shown at 266, leaving some fine detail, such as fine color transitions near boundaries between colors, out of the image. Such losses of detail may not be perceptible to a viewer. For example, the transmission of only some layers of image data is most likely to happen during periods of large areas of changes and high rates of motion, which are the times that the human perceptual system is least likely to notice the loss of detail. Furthermore, later-transmitted frames may add detail to the image rapidly enough to minimize or eliminate perceptible errors in the image.

Various features may be implemented in the decompression process that help to improve decompression performance, and thus to improve the performance of the display device 12 and image-rendering device 16 when showing video images. For example, to aid in the decompression of subsampled image data, image-rendering device 16 may include a decompression buffer for storing image data during decompression that is smaller than a cache memory associated with the processor performing the decompression calculations.

Known decompression systems for decompressing subsampled image data typically read an entire set of compressed image data into a decompression buffer before calculating the missing chrominance values. Often, the compressed image data is copied into a cache memory as it is read into the buffer, which allows the values stored in cache to be more quickly accessed for decompression calculations. However, because the size of a compressed image file may be larger than the cache memory, some image data in the cache memory may be overwritten by other image data as the compressed image data is copied into the buffer. The overwriting of image data in the cache memory may cause cache misses when the processor that is decompressing the image data looks for the overwritten data in the cache memory. The occurrence of too many cache memories may slow down image decompression to a detrimental extent.

The use of a decompression buffer that is smaller than cache memory may help to avoid the occurrence of cache misses. Because cache memory is typically a relatively small memory, such a decompression buffer may also be smaller than most image files. In other words, where the image data represents an image having an A×B array of pixels, the decompression buffer may be configured to hold an A×C array of image data, wherein C is less than B. Such a buffer may be used to decompress a set of subsampled image data by reading the set of subsampled image data into the buffer and cache memory as a series of smaller subsets of image data. Each subset of image data may be decompressed and output from the buffer before a new subset of the compressed image data is read into the decompression buffer. Because the decompression buffer is smaller than the cache memory, it is less likely that any image data in the cache memory will be overwritten while being used for decompression calculations.

The decompression buffer may have any suitable size. Generally, the smaller the decompression buffer is relative to the cache memory, the lower the likelihood of the occurrence of significant numbers of cache misses. Furthermore, the type of subsampled image data to be decompressed in the decompression buffer and the types of calculations used to decompress the compressed image data may influence the size of the decompression buffer. For example, the missing chrominance components in 4:2:0 image data may be calculated differently depending upon whether the subsampled chrominance values are co-sited or non-co-sited. Co-sited chrominance values are positioned at the same physical location on an image as selected luminance values, while non-co-sited chrominance values are positioned interstitially between several associated luminance values. The missing chrominance values of 4:2:0 co-sited image data may be calculated from subsampled chrominance values either on the same line as the missing values, or on adjacent lines, depending upon the physical location of the missing chrominance value being calculated. Thus, a decompression buffer for decompressing 4:2:0 co-sited image data, which has lines of data having no chrominance values, may be configured to hold more than one line of image data to allow missing chrominance values to be calculated from vertically adjacent chrominance values.

Any suitable method may be used to determine how many image data layers may be sent from image sources 18 to image-rendering device 16 during a single frame interval. For example, a simple method may be to detect when a frame of image data on an actively transmitting image source 18 is changed, and use the detected change as a trigger to begin a new compression and transmission process. In this manner, transmission of pyramidally encoded and compressed image data would proceed until a change is detected in the image displayed on the selected image source, at which time transmission of data for a prior image frame, if not yet completed, would cease.

Another example of a suitable method of determining how many image data layers may be sent during a single frame interval includes determining a bandwidth of the communications channel, and then calculating, from the detected bandwidth and the known frame rate of the image data, how much image data can be sent across the communications channel during a single frame interval. The bandwidth may be determined either once before or during transmission of the compressed image data, or may be detected and updated periodically.

Figure 9:
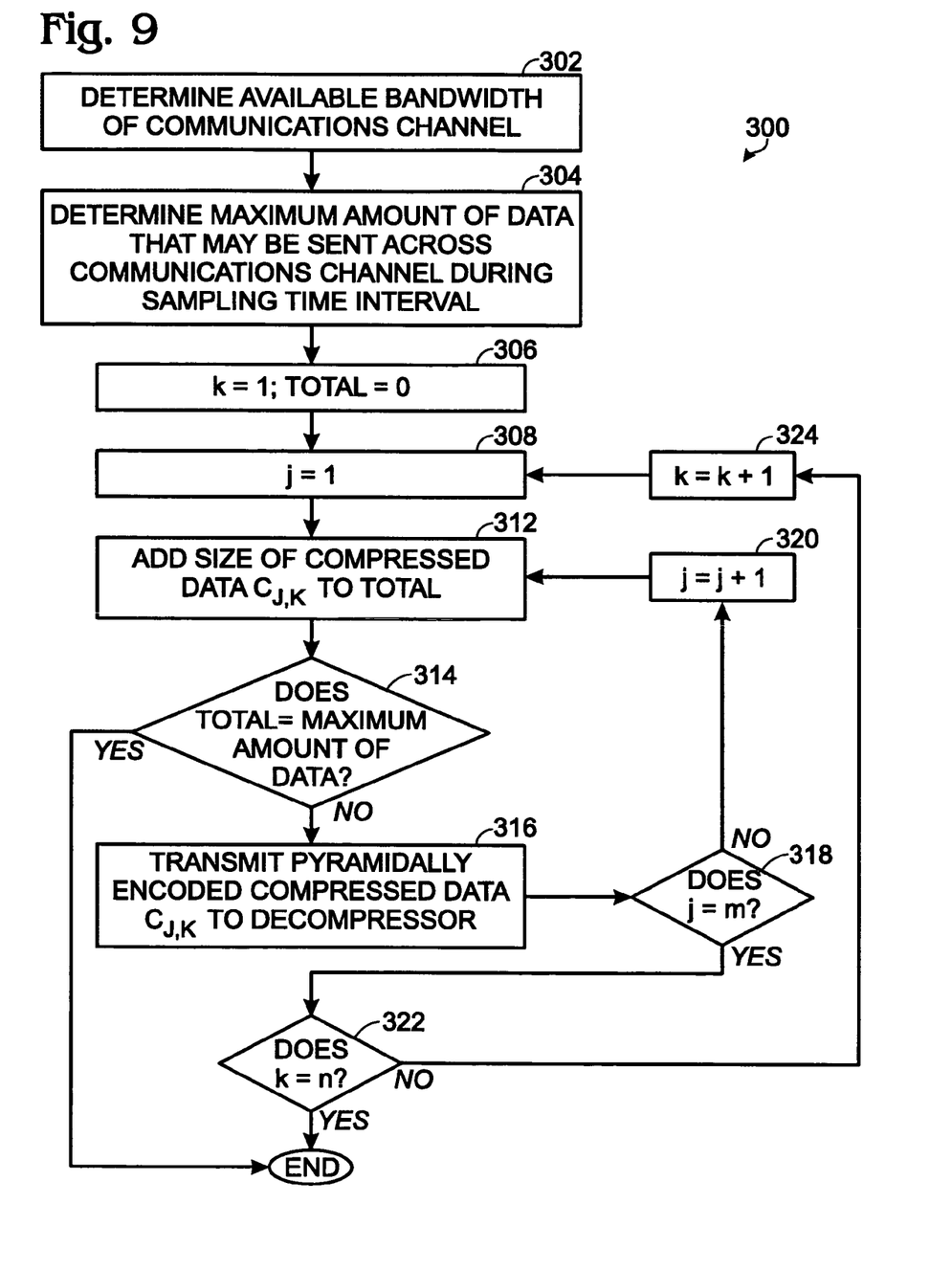
FIG. 9 is a flow diagram of an exemplary embodiment of a method of transmitting image data from an image source to a display device according to the present invention.

One exemplary embodiment of a suitable method for transmitting only as much of the pyramidally encoded, compressed image data as can be transmitted during a single frame interval is shown, generally at 300, in FIG. 9. Method 300 first includes determining, at 302, an available bandwidth of the communications channel over which the pyramidally encoded and compressed image data is to be sent to image-rendering device 16. From the measured bandwidth and the known frame rate of the pyramidally encoded and compressed image data, a maximum amount of data that can be sent over the communications channel between samplings of individual frames of image data is determined at 304.

Once the maximum amount of data that can be sent during a frame interval has been determined, method 300 commences data transmission. First, method 300 includes the initialization, at 306, of counter k and the tracking variable "total." The counter k is used to track the number of complete layers sent. Next, method 300 enters, at 308, a loop corresponding to counter k, where a counter j is initialized. The counter j is used to track the progress of the transmission of a single data layer.

Next, method 300 begins transmission of the image data. Before the transmission of a layer of data $C_{jk}$, the size of the next layer $C_{jk}$ is added to the value of the variable "total" at 312, and then the value of "total" is compared, at 314, to the maximum amount of data that can be transferred during a single frame interval. If the value of "total" after the size of the next data layer $C_{jk}$ is greater than the maximum amount of data that can be transmitted during a single frame interval, then the next data layer $C_{jk}$ is not transmitted, and the transmission of data is completed.

On the other hand, if the value of "total" is less than the maximum amount of data that can be transmitted during a single frame interval, then the next data layer $C_{jk}$ is transmitted at 316. Next, method 300 determines, at 318, whether the counting variable j is equal to m, which would indicate that a selected image data layer has been sent for all m regions 206. If j is not equal to m, then method 300 adds, at 320, a value of one to the counting variable j and loops back to 312. This loop continues until all data layers $C_{jk}$ for a fixed value of k have been transferred for all m regions 206.

Once all data layers $C_{jk}$ for a fixed value of k have been transferred for all m regions, method 300 determines, at 322, whether there are any layers of image data that have not yet been transmitted by comparing the counting variable k to the number of layers n. If k is less than n, then k is increased by a value of one at 324, and method 300 loops back to 308 to begin transmission of image data from the next-most detailed layer.

Software implementing the various compression and transmission operations of methods 100 and 300 may operate as a single thread, a single process, or may operate as multiple threads or multiple processes, or any combination thereof. A multi-threaded or multi-process approach may allow the resources of system 10, such as the transmission bandwidth, to be utilized more efficiently than with a single-threaded or single process approach. The various operations may be implemented by any suitable number of different threads or processes. For example, in one embodiment, three separate threads are used to perform the operations of methods 100 and 300. These threads may be referred to as the Receiver, Processor and Sender. The Receiver thread may obtain bitmap data generated from images on the screens of image sources 18. The Processor thread may perform the comparing, pyramidal encoding, and other compression steps of method 100. The Sender thread may perform the bandwidth monitoring and transmission steps of method 300. It will be appreciated that this is merely an exemplary software architecture, and that any other suitable software architecture may be used.

Thus, in some embodiments, a method of transmitting a plurality of frames of image data over a communications channel from a display image source to a display device is disclosed, wherein the plurality of frames of image data are transferred on a frame-by-frame basis at a predetermined time interval. The method may include encoding at least a portion of a selected frame of image data via hierarchical encoding to form a hierarchically encoded set of image data layers, and sending only a subset of the set of image data layers over the communications channel, wherein the subset of image data layers includes fewer image data layers than the set of image data layers.

Other embodiments provide a method of transmitting a plurality of frames of image data over a communications channel, wherein the plurality of frames of image data are transmitted over the communications channel on a frame-by-frame basis at a fixed time interval. The method may include locating portions of a selected frame of image data having changed pixels compared to an immediately prior frame of image data, dividing the portions having changed pixels into a plurality of regions for encoding, and pyramidally encoding each region to form a set of image data layers for each region, wherein each set of image data layers includes an image data layer encoding information having a least amount of detail, an image data layer encoding information having a greatest level of detail, and image data layers encoding information having intermediate levels of detail. The method also may include transmitting the image data layer encoding information having the least amount of detail for each region, and transmitting at least some of the other image data layers for each region until expiration of the fixed time interval.

Yet another embodiment provides a method of transmitting a plurality of frames of image data over a communications channel, wherein the plurality of frames includes a first frame having a lesser number of changes and a second frame having a greater number of changes relative to frames transmitted immediately prior to the first frame and the second frame. The method includes dividing portions of the first frame and second frame having the changes into a plurality of regions for encoding, pyramidally encoding each region to form a set of image data layers for each region, transmitting all of the image data layers for all of the regions of the first frame, and transmitting only a portion of the image data layers for all of the regions of the second frame.

Furthermore, although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of transmitting a plurality of frames of image data over a communications channel from a display image source to a display device, wherein the plurality of frames of image data are transferred on a frame-by-frame basis at a predetermined time interval, the method comprising:
    encoding at least a portion of a selected frame of image data via hierarchical encoding to form a hierarchically encoded set of image data layers; and
    sending only a subset of the set of image data layers over the communications channel, wherein the subset of image data layers includes fewer image data layers than the set of image data layers.

2. The method of claim 1, wherein the subset of image data layers includes only as many image data layers as can be sent during the predetermined time interval.

3. The method of claim 1, further comprising determining how many image data layers can be sent over the communications channel in the predetermined time interval before sending the subset of the set of image data layers.

4. The method of claim 1, wherein encoding at least a portion of the selected frame of image data includes:
    comparing the selected frame of image data to a previously sent frame of image data;
    identifying portions of the selected frame of image data having changes compared to the previously sent frame of image data; and
    dividing the portions having changed pixels into a plurality of regions for encoding.

5. The method of claim 4, further comprising separately encoding each region by hierarchical encoding to form a plurality of sets of image data layers.

6. The method of claim 5, wherein each set of image data layers of the plurality of image data layers includes a layer encoding information having a least amount of detail, a layer encoding information having a greatest level of detail, and layers encoding information having intermediate levels of detail.

7. The method of claim 6, wherein the layer encoding information having a least amount of detail is transmitted first, followed by layers of incrementally greater detail.

8. The method of claim 4, wherein the regions are equal-sized.

9. The method of claim 1, wherein the selected frame of image data is a first frame of image data and wherein the set of image data layers is a first set of image data layers, further comprising encoding at least a portion of a second frame of image data via hierarchical encoding to form a second set of image data layers, and then transmitting all image data layers of the second set of image data layers.

10. The method of claim 9, wherein the second frame of image data includes fewer changes relative to a prior frame of image data than the first frame of image data.

11. The method of claim 1, further comprising compressing each image data layer before transmitting the image data layer.

12. The method of claim 11, wherein each image data layer is compressed by at least one technique selected from the group consisting of subsampling, color space conversion, delta modulation and LZO compression.

13. The method of claim 1, wherein encoding at least a portion of a selected frame of image data via hierarchical encoding to form a hierarchically encoded set of image data layers includes pyramidally encoding at least a portion of the selected frame of image data layers.

14. The method of claim 1, wherein the display device is a projection device.

15. A method of transmitting a plurality of frames of image data over a communications channel to a projection device, wherein the plurality of frames of image data are transmitted over the communications channel on a frame-by-frame basis at a fixed time interval, the method comprising:
   locating portions of a selected frame of image data having changed pixels compared to an immediately prior frame of image data;
   dividing the portions having changed pixels into a plurality of regions for encoding;
   pyramidally encoding each region to form a set of image data layers for each region, wherein each set of image data layers includes an image data layer encoding information having a least amount of detail, an image data layer encoding information having a greatest level of detail, and image data layers encoding information having intermediate levels of detail;
   transmitting the image data layer encoding information having the least amount of detail for each region; and
   transmitting at least some of the other image data layers for each region until expiration of the fixed time interval.

16. The method of claim 15, wherein the other image data layers are transmitted in order of incrementally increasing detail.

17. The method of claim 16, wherein all image data layers of a selected level of detail are transmitted for all regions before an incrementally more detailed image data layer is transmitted for any region.

18. The method of claim 15, further comprising calculating a maximum amount of data that can be transmitted across the communications channel during the fixed time interval.

19. The method of claim 18, further comprising calculating, from the maximum amount of data that can be transmitted across the communications channel during the fixed time interval, a number of layers that can be transmitted across the communications channel during the fixed time interval.

20. The method of claim 15, further comprising compressing each image data layer before transmitting the layers of data.

21. The method of claim 20, wherein each image data layer is compressed by at least one technique selected from the group consisting of subsampling, color space conversion, delta modulation and LZO compression.

22. The method of claim 15, wherein different frames of image data have different quantities of changed pixels, and wherein different numbers of image data layers are transmitted for selected different frames of image data having different quantities of changed pixels.

23. A method of transmitting a plurality of frames of image data over a communications channel, wherein the plurality of frames includes a first frame having a lesser number of changes and a second frame having a greater number of changes relative to frames transmitted immediately prior to the first frame and the second frame, the method comprising:
   dividing portions of the first frame and second frame having the changes into a plurality of regions for encoding;
   pyramidally encoding each region to form a set of image data layers for each region;
   transmitting all of the image data layers for all of the regions of the first frame; and
   transmitting only a portion of the image data layers for all of the regions of the second frame.

24. The method of claim 23, wherein each set of image data layers includes an image data layer encoding information having a least amount of detail, an image data layer encoding information having a greatest level of detail, and image data layers encoding information having intermediate levels of detail, and wherein the image data layers encoding information having the least amount of detail are transmitted before the other image data layers.

25. The method of claim 23, wherein the plurality of frames of image data are sent periodically over the communications channel on a frame-by-frame basis at a fixed time interval.

26. The method of claim 25, further comprising determining how many image data layers can be sent over the communications channel during the fixed time interval before transmitting the image data layers for the first frame or second frame.

27. The method of claim 26, wherein determining how many image data layers can be sent during the fixed time interval includes periodically determining a maximum amount of data that can be sent over the communications channel during the fixed time interval.

28. The method of claim 25, wherein the portion of the image data layers of the second frame that is transmitted is a maximum number of image data layers that can be sent over the communications channel during the fixed time interval.

29. The method of claim 23, further comprising compressing each image data layer that is transmitted before transmitting the image data layers.

30. The method of claim 29, wherein the image data layers are compressed by at least one technique selected from the group consisting of subsampling, color space conversion, delta modulation and LZO compression.

31. On a computer-readable storage medium, instructions executable by a computing device for transmitting images to an image display device, the medium comprising:
   code for encoding at least a portion of a selected frame of image data via hierarchical encoding to form a hierarchically encoded set of image data layers; and
   code for sending only a subset of the set of image data layers over the communications channel, wherein the subset of image data layers includes fewer image data layers than the set of image data layers.

32. The storage medium of claim 31, wherein the subset of image data layers includes only as many image data layers as can be sent during a predetermined time interval.

33. A device for transmitting images for display, the device comprising:
   a means for locating portions of a selected frame of image data having changed pixels compared to an immediately prior frame of image data;
   a means for dividing the portions having changed pixels into a plurality of regions for encoding;
   a means for pyramidally encoding each region to form a set of image data layers for each region, wherein each set of image data layers includes an image data layer encoding information having a least amount of detail, an image data layer encoding information having a greatest level of detail, and image data layers encoding information having intermediate levels of detail;

a means for transmitting the image data layer encoding information having the least amount of detail for each region; and a means for transmitting at least some of the other image data layers for each region until expiration of the fixed time interval.

34. The device of claim 33, wherein the other image data layers are transmitted in order of incrementally increasing detail.

35. The device of claim 33, further comprising a means for compressing each image data layer before transmitting the layers of data.

* * * * *